(12) United States Patent
Queiras et al.

(10) Patent No.: US 11,820,491 B2
(45) Date of Patent: Nov. 21, 2023

(54) AIRCRAFT CONTROL SYSTEM AND ASSOCIATED AIRCRAFT

(71) Applicant: AIRBUS HELICOPTERS, Marignane (FR)

(72) Inventors: Nicolas Queiras, Les Pennes Mirabeau (FR); Patrick Hellio, Bouc Bel Air (FR)

(73) Assignee: AIRBUS HELICOPTERS, Marignane (FR)

( * ) Notice: Subject to any disclaimer, the term of this patent is extended or adjusted under 35 U.S.C. 154(b) by 148 days.

(21) Appl. No.: 17/592,769

(22) Filed: Feb. 4, 2022

(65) Prior Publication Data
US 2022/0250738 A1    Aug. 11, 2022

(30) Foreign Application Priority Data
Feb. 10, 2021    (FR) ...................................... 2101253

(51) Int. Cl.
*B64C 13/50*    (2006.01)
*B64C 13/04*    (2006.01)
(Continued)

(52) U.S. Cl.
CPC .......... *B64C 13/503* (2013.01); *B64C 13/042* (2018.01); *B64C 13/18* (2013.01)

(58) Field of Classification Search
CPC ..... B64C 13/503; B64C 13/042; B64C 13/18; B64C 27/57; B64C 3/0421; B64C 13/22;
(Continued)

(56) References Cited

U.S. PATENT DOCUMENTS 10,683,100 B2 *   6/2020   Bilbrey .................. G06F 3/017
2014/0027565 A1   1/2014   Marvin et al.
(Continued)

FOREIGN PATENT DOCUMENTS

EP    2759473 A1    7/2014
EP    2927784 A1    10/2015
(Continued)

OTHER PUBLICATIONS

French Search Report for French Application No. FR2101253, Completed by the French Patent Office, dated Oct. 27, 2021, 12 pages.

*Primary Examiner* — Tien Q Dinh
*Assistant Examiner* — Nevena Aleksic
(74) *Attorney, Agent, or Firm* — BROOKS KUSHMAN P.C.

(57) ABSTRACT

A control system for an aircraft allowing a pilot of the aircraft to control aerodynamic means, the control system comprising a processing unit for generating control commands, the control commands being transmitted to control devices to modify a position of the aerodynamic means and to pilot the aircraft according to four control axes having a pitch control axis, a roll control axis, a yaw movement control axis and a lift control axis, the control system comprising a control member generating control setpoints, the control setpoints being transmitted to the processing unit generating the control commands under the dependency of the control setpoints, the control member being mechanically disconnected from the control devices.

14 Claims, 2 Drawing Sheets

(51) Int. Cl.
*B64C 13/08* (2006.01)
*B64C 13/18* (2006.01)

(58) Field of Classification Search
CPC ..... B64C 27/56; B64C 13/0421; B64D 43/00; G05D 1/0061; G05D 1/02; G05D 1/04
See application file for complete search history.

(56) References Cited

U.S. PATENT DOCUMENTS

| | | |
|---|---|---|
| 2014/0263850 A1 | 9/2014 | Kerdreux et al. |
| 2015/0286291 A1 | 10/2015 | Bigand et al. |
| 2015/0375850 A1 | 12/2015 | Salesse-Lavergne |
| 2017/0001713 A1 | 1/2017 | Ott et al. |
| 2018/0244369 A1 | 8/2018 | Alfred et al. |
| 2020/0079507 A1 | 3/2020 | Deng et al. |
| 2020/0401142 A1 | 12/2020 | Abdelli |

FOREIGN PATENT DOCUMENTS

| | | |
|---|---|---|
| EP | 3366575 A1 | 8/2018 |
| FR | 2479133 A1 | 10/1981 |
| FR | 3038294 A1 | 1/2017 |
| FR | 3097527 A1 | 12/2020 |

* cited by examiner

AIRCRAFT CONTROL SYSTEM AND ASSOCIATED AIRCRAFT

CROSS-REFERENCE TO RELATED APPLICATIONS

This application claims priority to French patent application No. FR 21 01253 filed on Feb. 10, 2021, the disclosure of which is incorporated in its entirety by reference herein.

TECHNICAL FIELD

The present disclosure relates to a control system for an aircraft.

BACKGROUND

The disclosure targets more particularly a control system that makes it possible to simplify the piloting of an aircraft such as, for example, a fixed wing aircraft or a rotary wing aircraft, a helicopter in particular.

Generally, an aircraft pilot uses multiple separate control members such as, for example, levers, control columns, pedals or control wheels to pilot the aircraft according to several axes. Several mutually independent separate members notably make it possible to pilot the aircraft according to four control axes having a pitch control axis, a roll control axis, a yaw movement control axis and a lift control axis.

In addition, according to a first example and notably when the aircraft is a helicopter, such a lift control axis can make it possible for example to modify an altitude of the aircraft with respect to the sea level or, on the other hand, keep this altitude constant.

According to a second example and notably when the aircraft is an aeroplane, such a lift control axis can also make it possible to modify a thrust and therefore a speed of movement of the aircraft with respect to the ground.

Also known, as described in the document FR 2 479 133, are control systems that make it possible to control aerodynamic means of an aircraft, with mechanically disconnected flight controls. Such control systems are sometimes called "fly by wire" and then notably make it possible to improve the ergonomics of the cockpit and offer a better visibility by eliminating from the cockpit certain mechanical link parts such as, in particular, rods, control rods or cables. Furthermore, this document describes a single control lever that can be operated by a pilot. The control lever is thus movable according to a link of linear-annular type and then has three degrees of freedom in rotation and one degree of freedom in translation with respect to a seat of the aircraft on which the pilot is seated. Several movements are possible, namely a vertical movement upwards and downwards, a longitudinal movement forwards and backwards, a lateral movement to the right and to the left, and a rotation movement about a rotation axis arranged substantially vertically.

Force feedback systems act on the control lever to control the various movements of the control lever and make it possible to restore it to a central position of rest.

However, the operating of the control lever may require particular training and qualification of the pilot for this type of aircraft.

Furthermore, the longitudinal and lateral movements of the control lever can require a relatively significant manipulation force for the pilot. Such a control system can thus generate, through its prolonged use of repeated forces, sources of fatigue for the pilot.

The document EP 2 759 473 describes a control member provided with an attitude control lever for piloting an aircraft according to a lift control axis and a handle for controlling the aircraft according to a yaw movement control axis.

Thus, such a control member then makes it possible to group together the controls of the aircraft according to only two control axes. Such a control member must consequently be combined with, for example, a cyclic pitch control column or mini-stick for controlling the aircraft according to a pitch control axis and a roll control axis.

As described in the document FR 3 038 294, also known are control systems comprising two separate control members intended to be actuated respectively by a pilot and a co-pilot. Such control members comprise two mini-sticks which in particular allow pitch and roll control of the aircraft.

However, these control members must be associated with other control members that make it possible, for example, to produce control of the yaw movements and control of the lift of the aircraft.

The document U.S. Pat. No. 10,683,100 describes, for its part, a control system for an aircraft having a button 208 configured to control the movements of the aircraft on the ground or in the air. The button 208 is then movable with respect to a right arm rest of a seat. Four degrees of mobility of the button 208 are then described, namely, on the one hand, three translations according to three orthogonal axes, two axes being arranged horizontally and defining a plane and one vertical axis, and, on the other hand, a rotation according to the vertical axis.

Moreover, it is indicated that the button 208 can make it possible to direct the aircraft in all the directions and therefore according to six degrees of mobility with respect to the ground.

Nevertheless, the button 208 forms a handle that is movable with respect to a support linked to the aircraft.

The movements of this button 208 require the use of at least two fingers and oblige the pilot to perform rotational movements of his or her wrist, forearm, arm, even shoulder.

The document US 2014/027565 describes, for its part, a handle 18 extending a control column 14 making it possible to cyclically control the pitch of the blades of a helicopter rotor. Such a control column 14 is then movable in rotation according to at least two rotation axes with respect to a support linked to the aircraft.

This handle 18 can notably comprise a switch 450 allowing an automatic pilot to be engaged/disengaged.

The document EP 3 366575 relates, for its part, to an electric piloting system for a rotor craft comprising a computing device generating control laws.

These control laws can make it possible to engage roll or yaw movement command by means of a switch 402 of a pilot control set. The roll angle for the roll command (or the rate of yaw for the yaw command) is determined as a function of a speed of movement of the rotor craft. The switch 402 can be disposed on a handle 264a of an attitude control system lever. The switch 402 is, moreover, of "bip" type.

The documents US 2015/375850, FR 3 097527, EP 2 927784 and US 2020/079507, for their part, describe other realizations with different control buttons mounted on a cyclic pitch control column handle, even on a plate secured to an instrument panel.

SUMMARY

The object of the present disclosure is, then, to propose an alternative control system that makes it possible to overcome the abovementioned limitations.

Furthermore, one aim of the disclosure is to provide a control system whose use is intuitive and that has a control member that is simple to use and easy to operate.

The disclosure therefore relates to a control system for an aircraft, the control system being configured to allow a pilot of an aircraft to control aerodynamic means of an aircraft, the control system comprising a processing unit for generating control commands, the control commands being transmitted to control devices to modify a position of the aerodynamic means and to pilot the aircraft according to four control axes having a pitch control axis, a roll control axis, a yaw movement control axis and a lift control axis, the control system comprising a control member generating control setpoints, the control setpoints being transmitted to the processing unit generating the control commands under the dependency of the control setpoints, the control member being mechanically disconnected from the control devices.

According to the disclosure, such a control system is noteworthy in that the control member comprises at least:
  one multidirectional control interface generating control setpoints for piloting the aircraft on the one hand according to a first control axis and on the other hand according to a second control axis distinct from the first control axis, the first control axis and the second control axis being chosen from among the four control axes,
  a first bidirectional control button generating control setpoints for piloting the aircraft according to a third control axis distinct from the first control axis and from the second control axis, the third control axis being chosen from among the four axes, and
  a second bidirectional control button generating control setpoints for piloting the aircraft according to a fourth control axis distinct from the first control axis, from the second control axis and from the third control axis, the fourth control axis being chosen from among the four axes, and
  a handle configured to be gripped by a hand of the pilot, the multidirectional control interface, the first bidirectional control button and the second bidirectional control button being arranged on a first end of the handle, the multidirectional control interface, the first bidirectional control button and the second bidirectional control button being configured to be actuated by at least one finger of the hand of the pilot, the handle comprising a second end configured to be secured according to an embedment-type link with zero degree of freedom with a support of the aircraft.

In other words, the multidirectional control interface, the first bidirectional control button and the second bidirectional control button are borne by one and the same control member. Furthermore, the first bidirectional control button and the second bidirectional control button are respectively separate from the multidirectional control interface. Preferably, the multidirectional control interface, the first bidirectional control button and the second bidirectional control button can be juxtaposed alongside one another on an outer face of the handle.

In addition, the multidirectional control interface, the first bidirectional control button and the second bidirectional control button are added onto the outer face of the handle and do not therefore form a monolithic assembly with the handle which receives them.

Thus, such a handle which is grasped by a pilot or a co-pilot cannot be moved in translation or in rotation with respect to the support of the aircraft. The multidirectional control interface, the first bidirectional control button and the second bidirectional control button can thus be actuated only with the force of one or more fingers and do not require movement of the hand, the wrist, the forearm, the arm or even the shoulder with respect to the support of the aircraft.

The control member thus comprises a multidirectional control interface, a first bidirectional control button and a second bidirectional control button for piloting an aircraft according to the four control axes with no ergonomic coupling between them.

The piloting of the aircraft by means of such a control system is thus simpler to perform and requires gestures of one or two fingers of small amplitude and with limited coordination of the movements of the pilot.

The pilot can thus pilot the aircraft without performing any displacement or movement of the control member. The pilot does not therefore have to exert force on a control lever to move it and possibly counter return forces with his or her hand, wrist, forearm, arm or even shoulder. According to the disclosure, the pilot actuates only the multidirectional control interface, the first bidirectional control button and the second bidirectional control button for piloting the aircraft according to the four axes. Furthermore, the multidirectional control interface can comprise a ball, a ball knob, a face plate or a touchpad, d-pad, an analogue stick or even a button in Chinese cap form for example.

Such a multidirectional control interface can consequently be actuated by the palm of a hand or by one or more fingers of a hand of the pilot.

If necessary, a pilot of the aircraft can pilot the aircraft according to the four control axes only using one of his or her fingers of a hand, for example the thumb of his or her right hand. In this case, the multidirectional control interface, the first bidirectional control button and the second bidirectional control button cannot be actuated simultaneously and are actuated individually one after the other by a same finger of the pilot or of the co-pilot. For example, the multidirectional control interface, the first bidirectional control button and the second bidirectional control button are actuated by performing contacts of pulse types then by reverting automatically to a central position of rest. Feedback or return means can therefore be used to restore the multidirectional control interface, the first bidirectional control button and the second bidirectional control button to their respective central positions.

Furthermore, according to the chosen placement of the multidirectional and bidirectional control buttons on the control interface, a pilot of the aircraft can also pilot the aircraft according to the four control axes simultaneously using several of his or her fingers of a hand, for example the thumb, the index finger and middle finger of his or her right hand. In this case, the multidirectional control button is actuated by the thumb, the first bidirectional control button is actuated by the index finger and the second bidirectional control button can be actuated by the middle finger, all simultaneously, by performing contacts of pulse types then by next reverting automatically into a central position of rest.

Furthermore, the processing unit can comprise, for example, at least one processor and at least one memory, at least one integrated circuit, at least one programmable system, at least one logic circuit, these examples not limiting the scope given to the expression "processing unit". The term processor can equally denote a central processing unit known by the acronym CPU, a graphics processing unit GPU, a digital unit known by the acronym DSP, a microcontroller, etc.

Such a processing unit can be linked by wire or wirelessly to the multidirectional control interface to receive, for example, pitch and roll control setpoints. These control setpoints are then processed by the processing unit which generates control commands as output. Such control commands can vary under the dependency of other input parameters such as, for example, the speed of movement of the aircraft.

Thus, when the speed of movement is below a predetermined speed threshold, the multidirectional control interface can, via processing performed by the processing unit, allow the pilot to modify, for example a reference or a target ground speed according to a longitudinal direction and a lateral direction. These longitudinal and lateral directions can advantageously be chosen to be at right angles to one another and then make it possible to define, with a vertical direction linked to the force of gravity, an orthonormal terrestrial reference frame.

Alternatively, when the speed of movement is above this predetermined speed threshold, the multidirectional control interface and the processing unit can allow the pilot to modify, for example, a reference or a target air speed and/or possibly according to longitudinal and lateral directions.

Likewise, the first bidirectional control button and/or the second bidirectional control button can comprise a thumbwheel, a d-pad, an analogue stick or even a button in Chinese cap form for example.

According to an exemplary embodiment, the first bidirectional control button can be manipulated by a pilot according to a left direction oriented towards a left side of the aircraft and according to a right direction oriented towards a right side of the aircraft. The left and right sides are also defined with respect to an anteroposterior direction contained within an anteroposterior plane extending from a tail of the aircraft to a nose of the aircraft.

Moreover, the second bidirectional control button can be manipulated by the pilot according to an upward direction oriented toward a top or front side of the aircraft and according to a downward direction oriented towards a bottom or rear side of the aircraft.

Furthermore, the first bidirectional control button and the second bidirectional control button are also linked by wire or wirelessly to the processing unit so as to process the control setpoints thus generated and pilot the aircraft differently depending on the speed of movement of the aircraft.

Thus, when the speed of movement is below a predetermined speed threshold, the second bidirectional control button can allow the pilot to modify, for example, a reference or a target speed of movement according to the vertical direction of the terrestrial reference frame.

Alternatively, when the speed of movement is above this predetermined speed threshold, the second bidirectional control button can allow the pilot to modify, for example, a reference or a target slope of the current trajectory of the aircraft.

Moreover, whatever the speed of movement of the aircraft, the first bidirectional control button can allow the pilot to modify, for example, a heading reference or a target yaw angular speed of the aircraft.

According to an exemplary embodiment of the disclosure, the first control axis can be the pitch control axis, the second control axis can be the roll control axis, the third control axis can be the yaw control axis and the fourth control axis can be the lift control axis.

Advantageously, the first bidirectional control button and the second bidirectional control button can be grouped together and form a multidirectional control button.

In this case, the multidirectional control button can comprise, like the multidirectional control interface, a ball, a ball knob, a face plate or a touchpad, a d-pad, an analogue stick or even a button in Chinese cap form for example.

In this case, such a multidirectional control button can allow the pilot to pilot the aircraft according to the four control axes simultaneously using two of his or her fingers of a hand, for example the thumb and the index finger of his or her right hand.

Furthermore, several variant embodiments of the disclosure are envisaged according to the location of the handle in the cockpit of the aircraft.

According to another variant of the disclosure compatible with the preceding variants, the control member can comprise at least one monostable switch that can be actuated between a position of rest and an activated position generating a selection control setpoint.

Such a selection control setpoint is then transmitted by wire or wirelessly to the processing unit to select, for example, at least one automatic piloting mode and, generally, to consequently modify control commands at the output of the processing unit.

Furthermore, the control member can advantageously comprise one or more monostable switches described hereinbelow individually for greater clarity.

According to a first example, the selection control setpoint generated by the at least one monostable switch can make it possible to select a first automatic piloting mode called "approach mode", the approach mode being implemented by the processing unit by generating control commands to automatically pilot the aircraft according to a predetermined descent trajectory towards a landing zone.

Furthermore, in such an approach mode, the processing unit can also generate control commands that vary as a function of other parameters such as, for example, the speed of movement of the aircraft.

Thus, when the speed of movement is below a predetermined speed threshold, this approach mode can allow the pilot to preposition by default, independently of the position of the multidirectional or bidirectional control buttons, a reference or a target speed of movement according to the vertical direction of the terrestrial reference frame. Such a speed target can for example be 500 feet per minute (ft/min) or 152.4 metres per minute (m/min).

Alternatively, when the speed of movement is above this predetermined speed threshold, the approach mode can allow the pilot to preposition by default, for example, a reference or a target slope of the aircraft. Such a target slope can for example be equal to −4 degrees.

Advantageously, the first bidirectional control button and the second bidirectional control button being able to form a multidirectional control button, the at least one monostable switch can be formed by the multidirectional control button, the selection control setpoint being generated when the pilot exerts a pressure force on the multidirectional control button.

In other words, the multidirectional control button is multifunction allowing a pilot to pilot the aircraft according to the yaw movement control axis, according to the lift control axis and to command the selection of the approach mode when he or she wants to perform a landing phase.

According to a second example, the selection control setpoint generated by the at least one monostable switch can make it possible to select an automatic piloting mode called "stationary mode", the stationary mode being implemented by the processing unit by generating control commands to automatically command a reduction of speed of movement of the aircraft.

Furthermore, in such a stationary mode, the processing unit can also generate control commands that vary as a function of other parameters, such as, for example, the speed of movement of the aircraft.

Thus, when the speed of movement is below a predetermined speed threshold, the stationary mode can allow the pilot to select a zero ground speed of the aircraft.

Alternatively, when the speed of movement is above this predetermined speed threshold, the stationary mode can allow the pilot to reduce the speed of movement of the aircraft to another predetermined speed threshold which can, for example, be an optimal climb speed for the aircraft.

According to a third example, the selection control setpoint generated by the at least one monostable switch can make it possible to select an automatic piloting mode called "level mode", the level mode being implemented by the processing unit by generating control commands to automatically command a cancellation of a speed of movement of the aircraft according to a vertical direction.

In such a level mode, the processing unit can also generate control commands that vary as a function of other parameters such as, for example, the speed of movement of the aircraft.

Thus, when the speed of movement is below a predetermined speed threshold, the level mode can allow the pilot to request a zero vertical ground speed of the aircraft.

Alternatively, when the speed of movement is above this predetermined speed threshold, the level mode can allow the pilot to request a zero slope for the current trajectory of movement of the aircraft.

According to a fourth example, the selection control setpoint generated by the at least one monostable switch can make it possible to select an automatic piloting mode called "go-around mode", the go-around mode being implemented by the processing unit by generating control commands to automatically command an interruption of a landing phase of the aircraft.

In such a go-around mode, the processing unit can generate control commands to automatically command an avoidance manoeuvre and avoid, for example, a collision with an obstacle or during a missed approach. The aircraft can then automatically pick up altitude.

According to a particular exemplary embodiment of the disclosure, the control system being able to comprise an automatic piloting device, the selection control setpoint generated by the at least one monostable switch can make it possible to select a "revert to manual piloting mode", the revert to manual piloting mode being implemented by the processing unit on the one hand by deactivating the automatic piloting device initially activated to pilot the aircraft, and on the other hand by activating the control member to exclusively pilot the aircraft according to the four control axes.

Thus, such a revert to manual piloting mode can be selected by the pilot of the aircraft in case of emergency when, for example, the automatic piloting device fails or when an obstacle or another aircraft is present in the current trajectory of the aircraft. Once the revert to manual piloting mode is selected by the pilot, the automatic piloting device is no longer able to pilot the aircraft unless the pilot requests it again subsequently.

According to another particular exemplary embodiment of the disclosure, the control system comprising a set of several other control members, the selection control setpoint generated by the at least one monostable switch can make it possible to select a "revert to manual piloting mode", the revert to manual piloting mode being implemented by the processing unit on the one hand by deactivating the set of several other control members initially activated to pilot the aircraft, and on the other hand by activating the control member to exclusively pilot the aircraft according to the four control axes.

Furthermore, such a revert to manual piloting mode can be selected by the co-pilot of the aircraft in case of emergency, when, for example, the pilot falls sick or is no longer capable of piloting the aircraft. Once the revert to manual piloting mode is selected by the co-pilot, the pilot can then no longer pilot the aircraft.

Advantageously, the several other control members can comprise a control column intended to be actuated by a first hand of a pilot by generating pitch and roll control setpoints to pilot the aircraft according, on the one hand, to the pitch control axis and, on the other hand, the roll control axis, a lever intended to be actuated by a second hand of a pilot by generating lift control setpoints to pilot the aircraft according to the lift control axis and a rudder bar intended to be actuated by the feet of a pilot by generating yaw movement control setpoints to pilot the aircraft according to the yaw movement control axis, the revert to manual piloting mode being selected by a co-pilot of the aircraft.

In other words, the control member according to the disclosure makes it possible to have a simplified piloting station for the co-pilot and can be associated with a more conventional and more comprehensive piloting station for the pilot.

When the revert to manual piloting mode is not selected, the co-pilot can then perform functions of navigation of the aircraft, of monitoring of the flight parameters, of dialogue with the pilot or of monitoring of the outside environment. The co-pilot is however relieved of the aircraft piloting function.

Also, the subject of the present disclosure is an aircraft which is noteworthy in that it comprises an abovementioned control system.

The aircraft according to the disclosure is thus, for example, chosen from among the group comprising fixed-wing aircraft such as aeroplanes, rotary-wing aircraft such as rotor craft having one or more propulsion and/or lift rotors.

Advantageously, the second end of the handle can be secured to a support of the aircraft, the support being chosen from among the group comprising instrument panels, seats, arm rests, doors and pylons.

In this case, the control member is therefore secured and immobile with respect to a member of the cockpit of the aircraft such as an instrument panel, a seat, an arm rest, a door allowing the pilot to access the cockpit from the outside of the aircraft or even a pylon secured to the floor of the cockpit.

BRIEF DESCRIPTION OF THE DRAWINGS

The disclosure and the advantages thereof will become apparent with more details in the context of the following description with examples given illustratively with reference to the attached figures which represent.

DETAILED DESCRIPTION

The elements that are present in several distinct figures are assigned one and the same reference.

As already stated, the disclosure relates therefore to the field of aircraft control systems.

Figure 1:
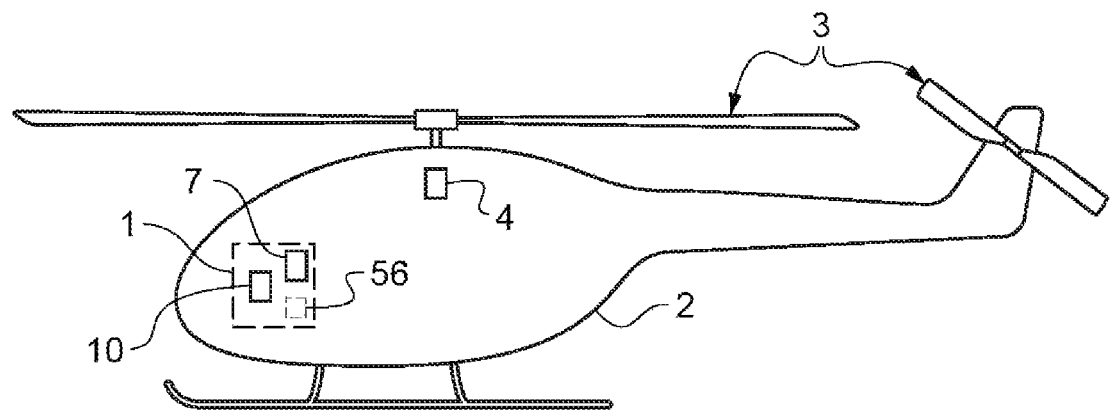
FIG. 1, a side view of a first example of an aircraft according to the disclosure, FIG. 2, a front view of a first variant embodiment of the disclosure, FIG. 3, a front view of a second variant embodiment of the disclosure, and FIG. 4, a perspective view of a second example of an aircraft according to the disclosure.

As represented in FIG. 1, an aircraft 2 can be piloted by manoeuvring, notably, aerodynamic means 3. These aerodynamic means 3 can for example comprise rotor blades when the aircraft 2 is a rotary-wing aircraft such as a rotor craft.

Such an aircraft 2 is, moreover, piloted by means of a control system 1 comprising a control member 10 generating control setpoints by means of electrical or optical signals transmitted to a processing unit 7.

The processing unit 7 is, for its part, configured to generate control commands as a function of the control setpoints received.

Such a control member 10 is thus mechanically disconnected from control devices 4 configured to modify a position of the aerodynamic means 3.

These control devices 4 can, for example, comprise cylinders, motors or servocontrols. Such control devices 4 then allow at least one pilot to pilot the aircraft 2 according to four control axes having a pitch control axis, a roll control axis, a yaw movement control axis and a lift control axis.

Such a control system 1 thus comprises a single control member 10 configured to allow a pilot to pilot the aircraft 2 according to the four control axes.

Figure 2:
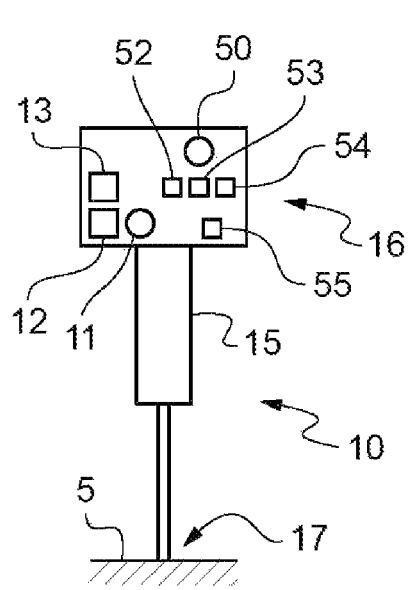

As represented in FIG. 2, this control member 10 comprises a multidirectional control interface 11 generating control setpoints transmitted to the processing unit 7. The processing unit 7 then generates the control commands under the dependency of the control setpoints and thus allows the pilot to pilot the aircraft 2 according to a first control axis and a second control axis. Such a first control axis can for example be the pitch control axis and the second control axis can be the roll control axis.

Furthermore, the multidirectional control interface 11 can comprise a ball, a ball knob, a face plate or a touchpad, a d-pad, an analogue stick or even a button in Chinese cap form.

Such a multidirectional control interface 11 can consequently be actuated by the palm of a hand or by one or more fingers of a hand of the pilot.

Furthermore, the control commands generated by the processing unit 7 can vary as a function of other parameters such as, for example, the speed of movement of the aircraft 2.

Thus, when the speed of movement is below a predetermined speed threshold, the multidirectional control interface 11 and the processing unit 7 can allow the pilot to modify, for example, a reference or a target ground speed according to a longitudinal direction and a lateral direction. Alternatively, when the speed of movement is above this predetermined speed threshold, the multidirectional control interface 11 and the processing unit 7 can allow the pilot to modify, for example, a reference or a target air speed of the aircraft 2.

The control member 10 also comprises a first bidirectional control button 12 that can be actuated for example to a left side and a right side to pilot the aircraft 2 according to a third control axis corresponding, for example, to the yaw movement control axis. The control member 10 also comprises a second bidirectional control button 13 that can be actuated, for example, towards an upper side and a lower side to pilot the aircraft 2 according to a fourth control axis corresponding, for its part for example, to the lift control axis.

As represented according to a first variant embodiment of the disclosure illustrated in FIG. 2, the first bidirectional control button 12 and the second bidirectional control button 13 can be independent of one another and comprise a thumbwheel, a d-pad, an analogue stick or even a button in Chinese cap form.

Figure 3:
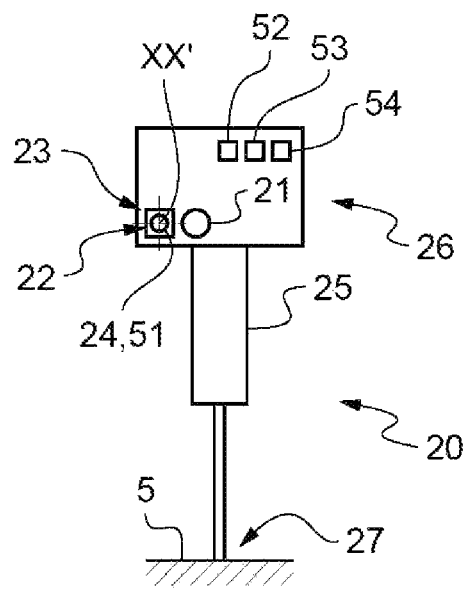

However, according to a second variant as represented in FIG. 3, the first bidirectional control button 22 and the second bidirectional control button 23 can advantageously be grouped together and form one multidirectional control button 24.

In this case, the multidirectional control button 24 can comprise, like a multidirectional control interface 11, 21, a ball, a ball knob, a face plate or a touchpad, a d-pad, an analogue stick or even a button in Chinese cap form.

Furthermore, the first bidirectional control button 12, 22 and the second bidirectional control button 13, 23 can possibly allow, via the processing unit 7, the pilot to control the aircraft 2 differently as a function of other parameters such as, for example, the speed of movement of the aircraft 2.

Thus, when the speed of movement of the aircraft 2 is below a predetermined speed threshold, the second bidirectional control button 13, 23 can allow the pilot to modify, for example, a reference or a target speed of movement according to the vertical direction of the terrestrial reference frame.

Alternatively, when the speed of movement of the aircraft 2 is above this predetermined speed threshold, the second bidirectional control button 13, 23 and the processing unit 7 can allow the pilot to modify, for example, a reference or a target slope of the current trajectory of the aircraft 2.

Moreover, whatever the speed of movement of the aircraft 2, the first bidirectional control button 12, 22 and the processing unit 7 can allow the pilot to modify, for example, a heading reference or a target yaw angular speed of the aircraft 2.

Moreover, as represented in FIGS. 2 and 3, the control member 10, 20 comprises a handle 15, 25 configured to be gripped by a hand of a pilot or of a co-pilot. In this case, the multidirectional control interface 11, 21, the first bidirectional control button 12, 22 and the second bidirectional control button 13, 23 are then arranged on a first end 16, 26 of the handle 15, 25. The multidirectional control interface 11, 21, the first bidirectional control button 12, 22 and the second bidirectional control button 13, 23 are then, for example, placed on an outer face of the handle 15, 25 juxtaposed alongside one another and configured, for example, to be actuated individually one after the other by a same finger of the hand of the pilot or co-pilot of the aircraft 2 holding the handle, for example the thumb.

Alternatively, the multidirectional control interface 11, 21, the first bidirectional control button 12, 22 and the second bidirectional control button 13, 23 can also be placed on the handle 15, 25 juxtaposed alongside one another and configured to be actuated individually one after the other by two fingers of the hand of the pilot or co-pilot of the aircraft 2 holding the handle, for example the thumb and the index finger.

Moreover, such a handle 15, 25 also comprises a second end 17, 27 which is secured by an embedment link with zero degree of freedom with a support 5 of the aircraft such as an instrument panel, a seat, an arm rest, a door or even a pylon secured with a floor of the cockpit of the aircraft 2.

Moreover, whatever the variant embodiment of the disclosure, the control member 10, 20 can comprise one or more monostable switches 50, 51, 52, 53, 54 allowing a pilot or a co-pilot for example to actuate different automatic piloting modes to facilitate the piloting of the aircraft 2.

These monostable switches 50, 51, 52, 53, 54 can also each be actuated between an idle position and an activated position generating a selection control setpoint.

Thus, such a monostable switch 50, 51 can make it possible to generate a selection control setpoint for selecting a first automatic piloting mode called "approach mode". This approach mode is implemented by the processing unit 7 by generating control commands to automatically pilot the aircraft 2 according to a predetermined descent trajectory towards a landing zone.

Furthermore, and with reference to FIG. 3, when the first bidirectional control button 22 and the second bidirectional control button 23 form one multidirectional control button 24, the monostable switch 51 can then also be formed by the multidirectional control button 24. In this case, the monostable switch 51 can be actuated by the pilot or the co-pilot by exerting a pressure force in a direction XX' according to which a rod of the multidirectional control button 24 extends.

Moreover, the selection control setpoint generated by the monostable switch 52 can make it possible to select a so-called "stationary mode" automatic piloting mode. Such a stationary mode is then implemented by the processing unit 7 by generating control commands to automatically command a reduction of the speed of movement of the aircraft 2, possibly to a substantially zero ground speed.

Furthermore, the selection control setpoint generated by the monostable switch 53 can make it possible to select an automatic piloting mode called «level mode». Such a level mode is then implemented by the processing unit 7 by generating control commands to automatically command a cancellation of the speed of movement of the aircraft 2 according to a vertical direction.

The selection control setpoint generated by the monostable switch 54 can make it possible to select an automatic piloting mode called "go-around mode". Such a go-around mode is then implemented by the processing unit 7 by generating control commands to automatically command an interruption of a landing phase of the aircraft 2.

Furthermore, as represented in FIG. 1, the control system 1 can also comprise an automatic piloting device 56 making it possible to pilot such an aircraft 2 with no particular action by a pilot to generate control setpoints.

Consequently, if a monostable switch 55 is actuated by a pilot, it then generates a selection control setpoint to select a "revert to manual piloting mode", this revert to manual piloting mode being implemented by the processing unit 7 on the one hand by deactivating the automatic piloting device 56 initially activated to pilot the aircraft 2, and, on the other hand, by activating the control member 10 to exclusively pilot the aircraft 2 according to the four control axes.

Figure 4:
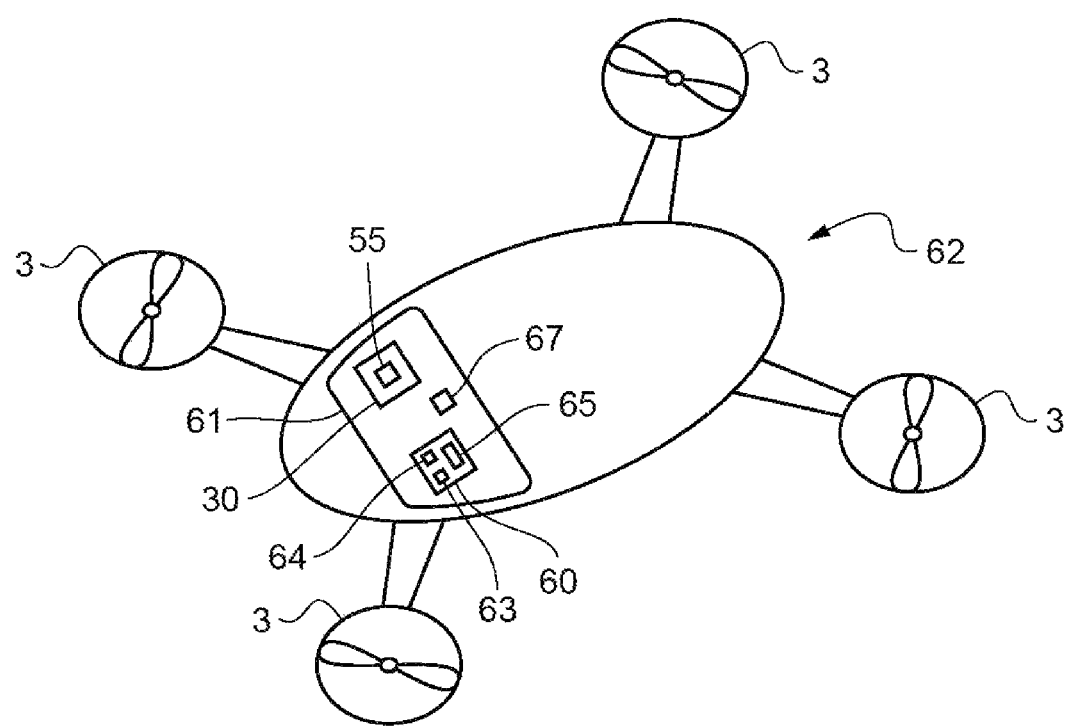

As represented in FIG. 4, a control system 61 can equip an aircraft 62 comprising a set 60 of several control members 63-65. In this case, the control member 30 can comprise another monostable switch 55 generating a selection control setpoint allowing a co-pilot to select a "revert to manual piloting mode".

Such a revert to manual piloting mode is then implemented by the processing unit 67 and thus allows a co-pilot of the aircraft 62 on the one hand to deactivate all of the several other control members 63-65 initially activated to pilot the aircraft 62, and, on the other hand, to activate the control member 30 to allow the co-pilot to exclusively pilot the aircraft 62 according to the four control axes.

In this case, the other control members 63-65 can notably comprise a control column 63 intended to be actuated by a first hand of a pilot by generating pitch and roll control setpoints to pilot the aircraft 62 according to the pitch control axis and the roll control axis. The other control members can also comprise a lever 64 intended to be actuated by a second hand of the pilot by generating lift control setpoints to pilot the aircraft 62 according to the lift control axis and a rudder bar 65 intended to be actuated by the feet of the pilot by generating yaw movement control setpoints to pilot the aircraft 62 according to the yaw movement control axis.

Such a revert to manual piloting mode can be actuated by the co-pilot of the aircraft 62 in case of an emergency if, for example, the pilot falls sick or is no longer capable of piloting the aircraft 62. The revert to manual piloting mode can also be associated with several automatic piloting laws of the aircraft 62 to, for example, automatically pilot a stationary flight, a slowdown of the speed of advance, a cancellation of the speed of vertical movement, a go-around, etc.

Furthermore, and as represented in FIG. 4, the aircraft 62 can comprise several rotors 3 arranged, for example, substantially coplanar alongside one another. Different arms then make it possible to bear the rotors 3 and arranged them laterally with respect to a cockpit.

Of course, the control system 61 illustrated in FIG. 4 can also equip the aircraft 2 illustrated in FIG. 1 and, conversely, the two variant embodiments of the control member 10, 20 illustrated in FIGS. 2 and 3 are compatible with the control system 61.

Naturally, the present disclosure is subject to numerous variations with respect to its implementation. Although several embodiments have been described, it is well understood that it is not possible to exhaustively identical all possible embodiments. It is of course possible to envisage replacing a means described with an equivalent means without departing from the scope of the present disclosure.

The invention claimed is:

1. A control system for an aircraft, the control system being configured to allow a pilot of the aircraft to control aerodynamic means of an aircraft, the control system comprising a processing unit for generating control commands, the control commands being transmitted to control devices to modify a position of the aerodynamic means and to pilot the aircraft according to four control axes having a pitch control axis, a roll control axis, a yaw movement control axis and a lift control axis, the control system comprising a control member generating control setpoints, the control setpoints being transmitted to the processing unit generating the control commands under the dependency of the control setpoints, the control member being mechanically disconnected from the control devices, wherein the control member comprises at least:
one multidirectional control interface generating control setpoints for piloting the aircraft on the one hand according to a first control axis and on the other hand according to a second control axis distinct from the first control axis, the first control axis and the second control axis being chosen from among the four control axes,
a first bidirectional control button generating control setpoints for piloting the aircraft according to a third control axis distinct from the first control axis and from the second control axis, the third control axis being chosen from among the four axes, a second bidirectional control button generating control setpoints for piloting the aircraft according to a fourth control axis distinct from the first control axis, from the second control axis and from the third control axis, the fourth control axis being chosen from among the four axes, and a handle configured to be gripped by a hand of the pilot, the multidirectional control interface, the first bidirectional control button and the second bidirectional control button being arranged on a first end of the handle, the multidirectional control interface, the first bidirectional control button and the second bidirectional control button being configured to be actuated by at least one finger of the hand of the pilot, the handle comprising a second end configured to be secured by an embedment-type link with zero degree of freedom with a support of the aircraft.

2. The system according to claim claim 1,
wherein the first control axis is the pitch control axis, the second control axis is the roll control axis, the third control axis is the yaw control axis and the fourth control axis is the lift control axis.

3. The system according to claim 1,
wherein the first bidirectional control button and the second bidirectional control button are grouped together and form one multidirectional control button.

4. The system according to any one of claim 1,
wherein the control member comprises at least one monostable switch that can be actuated between an idle position and an activated position generating a selection control setpoint.

5. The system according to claim claim 4,
wherein the selection control setpoint generated by the at least one monostable switch makes it possible to select an automatic piloting mode called "approach mode", the approach mode being implemented by the processing unit by generating control commands to automatically pilot the aircraft according to a predetermined descent trajectory towards a landing zone.

6. The system according to claim 5,
wherein the first bidirectional control button and the second bidirectional control button being able to form a multidirectional control button, the at least one monostable switch is formed by the multidirectional control button, the selection control setpoint being generated when the pilot exerts a pressure force on the multidirectional control button.

7. The system according to claim 4,
wherein the selection control setpoint generated by the at least one monostable switch makes it possible to select an automatic piloting mode called "stationary mode", the stationary mode being implemented by the processing unit by generating control commands to automatically command a reduction of speed of movement of the aircraft.

8. The system according to claim 4,
wherein the selection control setpoint generated by the monostable switch makes it possible to select an automatic piloting mode called "level mode", the level mode being implemented by the processing unit by generating control commands to automatically command a cancellation of a speed of movement of the aircraft in a vertical direction.

9. The system according to claim 4,
wherein the selection control setpoint generated by the at least one monostable switch makes it possible to select an automatic piloting mode called "go-around mode", the go-around mode being implemented by the processing unit by generating control commands to automatically command an interruption of a landing phase of the aircraft.

10. The system according to claim 4,
wherein the control system comprising an automatic piloting device, the selection control setpoint generated by the at least one monostable switch makes it possible to select a "revert to manual piloting mode", the revert to manual piloting mode being implemented by the processing unit on the one hand by deactivating the automatic piloting device initially activated to pilot the aircraft, and on the other hand by activating the control member to exclusively pilot the aircraft according to the four control axes.

11. The system according to claim 4,
wherein the control system comprising a set of several other control members, the selection control setpoint generated by said at least one monostable switch makes it possible to select a "revert to manual piloting mode", the revert to manual piloting mode being implemented by the processing unit on the one hand by deactivating the set of several other control members initially activated to pilot said aircraft, and on the other hand by activating the control member to exclusively pilot the aircraft according to the four control axes.

12. The system according to claim claim 11,
wherein the several other control members comprise a control column intended to be actuated by a first hand of a pilot by generating pitch and roll control setpoints to pilot the aircraft according, on the one hand, to the pitch control axis and, on the other hand, to the roll control axis, a lever intended to be actuated by a second hand of a pilot by generating lift control setpoints to pilot the aircraft according to the lift control axis and a rudder bar intended to be actuated by the feet of a pilot by generating yaw movement control setpoints to pilot the aircraft according to the yaw movement control axis, the revert to manual piloting mode being selected by a co-pilot of the aircraft.

13. An aircraft
wherein the aircraft comprises a control system according to claim 1.

14. The aircraft according to claim 13,
wherein the second end of the handle is secured to a support of the aircraft, the support being chosen from among the group comprising instrument panels, seats, arm rests, doors and pylons.

* * * * *